United States Patent Office 3,303,186
Patented Feb. 7, 1967

3,303,186
RECOVERY OF HECOGENIN ACETATE
Martin Rubin, 3218 Pauline Drive,
Chevy Chase, Md. 20015
No Drawing. Filed Feb. 26, 1965, Ser. No. 435,697
6 Claims. (Cl. 260—239.55)

The present application relates to the recovery of hecogenin acetate from plant sources.

Hecogenin is a well known source material for production of corticoid steroids such as for example cortisone, hydrocortisone, dexamethazone, and others. In turn hecogenin is obtainable from various species of Agave, and numerous procedures for recovering hecogenin therefrom have been described both in patents and in the scientific literature. Unfortunately no completely satisfactory procedure appears yet to have been devised.

The Agave species itself may vary substantially in hecogenin content depending upon the soil, climate, the rainfall, the age of the plant, and the portion of the plant treated. In some species the presence of other steroidal constituents sharply complicates the isolation procedure for recovery of the desired hecogenin. In consequence, the practical uncertainties have required detailed procedures for isolation of hecogenin to be tailored specifically to a specific plant source to the extend even where isolation of hecogenin from *Agave sisalana* (grown widely in Kenya, Tanzania and Jamaica) requires selective modifications to recover the same product from the same plant from different geographic locales, as witness the discussion in British Patent 768,459, page 2, lines 85–90, where attention is directed to modifications needed for Kenyan as compared to Tanzanian source materials.

The difference in procedure as applied to different species such as for example *Agave toumeyana*, *Agave semlata*, and *Agave fourcroydes* are at least as substantial as witness the several procedures described in the Wall et al. Patents 2,686,752; 2,711,408; and 2,719,845.

The principal object of the present invention is to provide a novel recovery sequence for the recovery of hecogenin and hecogenin acetate.

A further object of the present invention is to provide an extraction procedure tailored to a novel source material for hecogenin and hecogenin acetate.

Further objects and the advantages of the present invention will be apparent from the description thereof which follows.

The extensive surveys made by the U.S. Department of Agriculture on the steroidal content of thousands of plants (see for example Journal of the American Pharmaceutical Association; Scientific Edition, vol. XLVI, 653 (1957)) does not seem to have included investigation of *Furcraea macrophylla* as a possible source of steroids. This material, cultivated commercially as a fiber-bearing plant in Colombia, has now been found capable of providing hecogenin of excellent purity when processed as is herein described. Restated, the present invention is specifically adapted to recovery of hecogenin acetate from *Furcraea macrophylla*.

The initial starting material for practice of the present invention is the juice remaining after the fiber content of the leaf has been extracted. This juice is screened to remove small fiber particles and pulp, then allowed to ferment and autolyze for an extended period of time, e.g., 1–2 months. The resulting sediment is collected and dried. Desirably the sediment is dried to a moisture content in the range of about 0–40%. Ordinary sun drying not supplemented by other drying means usually produces an acceptable product (containing about 20% by weight of moisture).

For steroid extraction purposes all the moisture should be removed, and desirably, the present procedure provides for extraction and moisture removal concurrently. Thus the sun dried fermented and autolyzed juice sediment may be suspended in a large volume of nitrobenzene and heated to boiling, thereby azeotropically removing the water as vapor along with some solvent vapors. The vapors are condensed and the solvent layer returned to the refluxing mixture. When water removal is complete, the extraction is readily completed and the insoluble material can be removed from the extract solution by filtration.

Thereafter the extract is refluxed several hours with stirring in the presence of an aqueous solution of sodium hydroxide. Advantageously present may be up to 10% (by volume of the nitrobenzene solution) of an alcohol selected from the group consisting of methanol, ethylene glycol, and diethylene glycol and mixtures thereof. Presence of the alcoholic solvent apparently favors removal of fats and pigments by this treatment with aqueous caustic.

The next step in the present procedure is again azeotropic distillation of water from the steroid solution followed by treatment with acetic anhydride.

After an appropriate amount of acetic anhydride has been added followed by refluxing for about ½–2 hours, the excess anhydride is decomposed and the nitrobenzene removed by subjecting the nitrobenzene solution to steam distillation. The steroidal residue is then extracted with a suitable solvent, e.g., ethyl acetate and recrystallized from acetone to a commercially pure hecogenin acetate.

As a variation in the above procedure, the initial extraction of the steroid content from the dried plant residue may be effected with a chlorinated solvent selected from the group consisting of ethylene dichloride, trichlorethylene, perchlorethylene and mixtures thereof. The same azeotropic removal of water technique can be employed with the chlorinated solvent allowing simultaneous extraction and water removal with return of the condensed solvent to the extract mixture. The chlorinated hydrocarbon extract may then be evaporated to recover the extract and the residue redissolved in nitrobenzene which solution is then treated as above described to recover ultimately the hecogenin acetate.

The specific advantage of first extracting with chlorinated hydrocarbon is that these solvents are stable and non-toxic allowing the extraction initially to be effected in the field. A relatively small quantity of an extract product having a high steroid content results which product can be shipped inexpensively to a location of further treatment and consumption. Otherwise there may be the greater expense of shipping the low steroid content dry plant residue.

A specific advantage of the present procedure is that nitrobenzene allows the initial extraction, the purification, and the acetylation to be carried out in the same solution greatly simplifying the procedure and equipment over previously known procedures.

For further understanding of the present invention, the following specific examples of the preferred practice thereof are presented:

*Example I*

The juice obtained by the normal decortication procedures for removing fiber from *Furcraea macrophylla* plant is screened to remove therefrom pulp and small fibers and then is allowed to ferment and autolyze for one month. The sediment which settles during this time period is collected by filtration and sun dried to a powdery material of approximately 20% moisture content.

An appropriate quantity of sediment, i.e., 1.25 kg. (1 kg. dry weight) is suspended in 3 liters of nitrobenzene and the mixture stirred and heated under refluxing conditions with provision (a Dean-Stark trap) for removing the condensed azeotropically removed water and returning the nitrobenzene solvent to the refluxing mixture. After water removal has been completed the still warm nitrobenzene mixture is filtered to remove the insoluble materials.

Th nitrobenzene extract is then refluxed for two hours with stirring in the presence of 500 ml. of an aqueous 5% solution of sodium hydroxide and 150 ml. of methanol. The aqueous alkali phase is then decanted and the nitrobenzene washed with successive 500 ml. portions of water until the aqueous washings are no longer alkaline.

The nitrobenzene extract solution is again heated (with stirring) under reflux conditions with provision for removing the azeotropically entrained water from the condensed solvent, the heating being continued until the solution is anhydrous. Thereafter the nitrobenzene solution is cooled to below about 75° C., 100 ml. of acetic anhydride added and the solution heated under refluxing conditions, this time for one hour. Thereafter the excess anhydride is decomposed and the nitrobenzene simultaneouslyy removed by subjecting the solution to steam distillation.

The residue remaining after the steam distillation is extracted with 3 liters of ethyl acetate, the extract washed with 5% sodium carbonate solution and then with successive batches of 5% sodium chloride solution until the final aqueous washes are no longer alkaline. Removal of the ethyl acetate under vacuo leaves a pale yellow amorphous solid which when recrystallized from acetone yields 71 gm. of hecogenin acetate, M.P. 240–244° C.

*Example II*

A like 1.25 kg. of *Furcraea macrophylla* sediment (1 kg. dry) is suspended in 3 liters of ethylene dichloride. The mixture is heated to reflux with stirring the azeotropically removed water being discarded while condensed solvent is returned to the extract solution. Thereafter the extract is filtered to remove the undissolved residue, followed by drying under vacuo to leave a dry extract. This extract residue is taken up in 2 liters of nitrobenzene and thereafter treated in the manner described in Example I, i.e., with 400 ml. of 5% sodium hydroxide and 125 ml. of methanol, followed by treatment with 100 ml. of acetic anhydride, etc., 65 gm. of hecogenin acetate having the same approximate purity and melting point was obtained.

While the above procedure has been explicitly described in terms of the recovery of hecogenin acetate from *Furcraea macrophylla*. It should be understood that the invention as herein disclosed and claimed is not intended to be so limited, since other plant materials may be susceptible of the same treatment, and it is intended that the invention be limited only by the scope of the hereto appended claims.

What is claimed is:

1. A procedure for the recovery of hecogenin acetate from steroidal plant sources which comprises contacting dried plant material with nitrobenzene to dissolve the steroid content; thereafter treating the extract solution with aqueous dilute caustic to remove therefrom fat and pigment impurities; then dehydrating the solution; subsequently treating the extract solution with acetic anhydride to acetylate the hecogenin content thereof, followed by steam distillation to decompose excess anhydride and remove the nitrobenzene, and recovering hecogenin acetate from the steam distillation residue in a relatively pure state.

2. The procedure of claim 1 wherein the treatment of the nitrobenzene solution with aqueous alkali is effected in the further presence of a minor amount of an alcoholic solvent selected from the group consisting of methanol, ethylene glycol and diethyleneglycol and mixtures thereof.

3. The process of claim 1 wherein the steroidal plant material is the extract product remaining from contact of dried plant material with a chlorinated solvent selected from the group consisting of ethylene dichloride, trichlorethylene and perchlorethylene and mixtures thereof.

4. The process of claim 3 wherein the dried plant residue has a moisture content ranging up to about 40% and wherein extraction with said chlorinated solvent is effected under refluxing conditions with removal of azeotropically entrained water from the vapor condensate and with return of the condensed solvent to the extract mixture.

5. The process of claim 4 wherein the steroid material is a fermented and autolyzed juice residue obtained from *Furcraea macrophylla*.

6. The process of claim 1 wherein the steroid residue is a fermented and autolyzed residue of the plant juices obtained from *Furcraea macrophylla* and contains a moisture content of up to about 40% by weight thereof and wherein the extraction procedure is effected under refluxing conditions which azeotropically remove water and return the solvent portion of the condensed vapors to the mixture being extracted.

No references cited.

LEWIS GOTTS, *Primary Examiner.*

ELBERT ROBERTS, *Assistant Examiner.*